United States Patent [19] | [11] 4,330,097

George et al. | [45] May 18, 1982

[54] VARIABLE FORCE INERTIAL ARM WINDING CONTROL SYSTEM

[75] Inventors: Mark S. George; Arthur W. Stucke, both of Dayton, Ohio

[73] Assignee: Hobart Corporation, Troy, Ohio

[21] Appl. No.: 177,299

[22] Filed: Aug. 11, 1980

[51] Int. Cl.³ ........................ B65H 59/38; G03B 1/04; G11B 15/32

[52] U.S. Cl. ........................................ 242/187; 156/384

[58] Field of Search ............... 242/186, 187, 189, 193, 242/194, 67.3 R-67.5; 221/73; 352/156; 101/227, 228; 156/235, 238, 360, 540-542

[56] References Cited

U.S. PATENT DOCUMENTS

| | | | |
|---|---|---|---|
| 3,342,661 | 9/1967 | Arvidson et al. | 156/360 |
| 3,367,591 | 2/1968 | Le Gros et al. | 242/193 |
| 3,526,189 | 9/1970 | Allen | 156/384 |
| 3,556,898 | 1/1971 | Allen | 156/384 |
| 3,627,219 | 12/1971 | Hanson et al. | 242/187 |
| 3,696,967 | 10/1972 | Moore et al. | 221/73 |
| 3,729,362 | 4/1973 | French et al. | 156/542 |
| 3,985,603 | 10/1976 | Berner | 156/235 |
| 3,995,789 | 12/1976 | Carle | 242/193 |
| 4,111,121 | 9/1978 | Borum | 101/227 |
| 4,120,245 | 10/1978 | Karp et al. | 101/288 |

*Primary Examiner*—Leonard D. Christian
*Attorney, Agent, or Firm*—Biebel, French & Nauman

[57] ABSTRACT

A printer system for printing upon labels mounted on a web of release material, includes a stationary reel support upon which a supply reel and a take up reel are mounted for free rotation thereon. A printer is mounted adjacent a supply path extending from the supply reel to the take up reel, and a web drive arrangement is provided for engaging the web and transporting the web past the printer. A reel actuating arrangement, such as an inertial arm, is provided for applying a web unreeling force to the web of material adjacent the supply roll, which force is dependent upon and varies with the radius of the supply roll. A clutch is interposed between the supply reel and the take up reel for rotating the take up reel as the web is unreeled from the supply roll mounted on the supply reel such that substantially the same amount of web of release material is wound onto a take up roll on the take up reel as is unreeled from the supply roll.

11 Claims, 10 Drawing Figures

VARIABLE FORCE INERTIAL ARM WINDING CONTROL SYSTEM

BACKGROUND OF THE INVENTION

The present invention relates generally to printing devices and, more particularly, to a supply reel actuator or arm useful in a printer of the type adapted for printing on labels coated with a pressure-sensitive adhesive which are carried by a web of release material.

Label printing and dispensing devices are known in which variable information is printed on each of a series of labels having a pressure-sensitive adhesive coating the back surface thereof, with printing being accomplished while the labels are mounted on a strip or web of a release material. Such printers are suitable for use in an automatic computing scale system which weighs food products or other articles. The printer in such a system prints various information, such as the weight, the price per unit weight, and computed value of an article on a label which is thereafter affixed to the article. Computing scale systems of this type have found wide use in food markets which sell commodities, such as meat, in prepackaged form with a printed label being attached to each package prior to arrangement in the display case.

Typically in such printers, the strip of release material carrying the printed labels is caused to pass around a sharp edge which strips the labels from the release material. The labels are thereafter transferred to a label application station where they are applied to the weighed articles. Some types of systems, such as shown in U.S. Pat. No. 3,342,661, issued Sept. 19, 1967, to Arvidson et al, provide for automated application of the labels to the articles. Other systems, such as shown in U.S. Pat. No. 3,556,898, issued Jan. 19, 1971, to Allen, and U.S. Pat. No. 3,985,603, issued Oct. 12, 1976, to Berner, simply deliver the printed label to a chute where the label is held with its adhesive-coated side facing upward for manual application of the label to the articles.

Generally, a printer of this type includes a supply roll from which the web of release material bearing the unprinted labels is unreeled. The web is transported past one or more printing stations and, thereafter, passes around the sharp edge which removes the printed labels from the release material. The web is then wound onto a take up roll or otherwise disposed of. Commonly, the supply roll may be mounted for free rotation on a support shaft while the web of release material is unreeled from the supply roll by means of a web drive mechanism which positively engages the web. Such an arrangement is shown in U.S. Pat. No. 3,526,189, issued Sept. 1, 1970, to Allen, and U.S. Pat. No. 3,556,898, issued Jan. 19, 1971, to Allen.

Where a take up roll is provided for collecting the web of release material after removal of the labels, this take up roll may be driven by a separate drive mechanism, as shown in U.S. Pat. No. 4,111,121, issued Sept. 5, 1978, and U.S. Pat. No. 3,729,362, issued Apr. 24, 1973, to French et al. Alternatively, the take up roll may be driven by a belt drive arrangement connected to the drive mechanism for the web drive rollers, as shown in U.S. Pat. No. 3,696,967, issued Oct. 10, 1972, to Moore et al and U.S. Pat. No. 4,120,245, issued Oct. 17, 1978, to Karp et al. Typically, such a belt drive arrangement includes a slip clutch connection between the web drive and the take up roll so that the take up roll may rotate more slowly as the roll radius increases. Since the supply roll in such systems is not positively driven but rather rotates as the web is unreeled by the web drive mechanism, a brake mechanism, as shown in the above identified French et al '362 patent, may be connected to the supply roll to prevent it from continuing to rotate after a length of the web has been withdrawn from the supply roll.

Prior art web drive mechanisms, including arrangements for rotating a take up roll and also for limiting the rotation of a supply roll, are relatively complicated. Additionally, web drive mechanisms of the type which include separate drive motors for the web and the take up roll are relatively expensive. The belt drive arrangements of some systems which extend between the various rotating elements of the printer are also subject to wear and to failure. Accordingly, it is seen that there is a need for a simple, reliable supply mechanism for transporting past a printer a web of release material, bearing labels which are to be printed, and for winding the web of release material onto a take up roll after removal of the labels.

Another problem encountered with prior art printers results from the inertia of the supply roll and the take up roll. Typically, the web of release material is moved past the printer in an incremental manner. That is, the web is moved by a distance equal to the spacing between the centers of adjacent labels between each printing operation, while being held stationary during printing. It will be appreciated that if a relatively large supply roll is utilized in order to minimize the frequency with which new supply rolls must be loaded into the printer, such a supply roll will present substantial resistance to rotation by reason of its inertia. As a consequence, it has been necessary to provide high torque drive mechanisms for both the supply roll and the take up roll to overcome the inertia of these rolls where rapid incremental rotation of the rolls is required. As a consequence, the costs of the overall printer systems have been increased substantially.

Accordingly, it is seen that there is a need for a web supply arrangement for transporting a web past a printer, while minimizing the torque requirements of the drive mechanism.

SUMMARY OF THE INVENTION

The above mentioned problems and needs are satisfied by the reel actuating device of the present invention. The device is incorporated in a system having a rotatably mounted supply reel, a supply roll of a web of material wound on the reel, and web drive means for transporting the web of material. The reel actuating device for causing unreeling of the web of material from the supply reel, which decreases the radius of the supply roll, includes a supply reel actuator engaged with the web at a location between the web drive means and the supply reel for applying a web unreeling force to the web. The supply reel actuator is movable between a first position, in which the web supply path length between the supply roll and the web drive means is relatively long, and a second position, in which the web supply path length between said supply roll and said web drive means is shortened. The actuating device also includes an actuator spring means for applying a spring biasing force to the supply reel actuator urging the same toward its first position although movement of the web by the web drive means initially causes the actuator to move toward its second position while the supply reel remains stationary. Thereafter, the actuator spring means moves the actuator back toward its first position, causing the actuator to apply the web unreeling force to the web and thereby rotate the supply reel and unreel the web therefrom.

More particularly, the reel actuating device being in the preferred embodiment a variable inertial arm system, includes a stationary mounting means and an actuator arm, pivotally mounted at a first end thereof to the stationary mounting means. A web contacting roller is mounted on a second end of the actuator arm and engaged with the web at a location between the web drive means and the supply reel for applying a web unreeling force to the web. A supply roll follower means is pivotally mounted on the stationary mounting means and extends to a position in contact with the periphery of the supply roll. The position of the roll follower means changes in response to decrease in the radius of the supply roll as the web of material is unreeled from the supply reel. A spring means, mounted on the stationary mounting means and cooperating with the supply roll follower means, applies a spring force to the actuator arm at a point intermediate the first and second ends thereof. Application of the spring force, in turn, causes the application of the web unreeling force by the web contacting roller to the web, with the spring and web unreeling forces varying in magnitude in dependence upon the position of the supply roll follower means.

The spring means includes a lever arm member engaging the actuator arm at the point intermediate the first and second ends thereof, a spring linkage means engaging the lever arm member at a predetermined distance from the point intermediate the first and second ends of the actuator arm, and an actuation spring connected to the spring linkage means for applying a substantially constant spring force thereto. The spring means further includes slidable pivot means engaging an end of the lever arm member. The slidable pivot means permits the lever arm member to pivot about a pivot point, and further permits translational movement of the lever arm member, whereby the spacing between the pivot point and the points at which the lever arm member engages the actuator arm and the spring linkage means may be varied such that the position of the lever arm member is controlled by the position of the supply roll follower means, thereby determining the force applied to the web by the web contacting roller in dependence upon the radius of the supply roll.

The supply roll follower means may include a follower arm having a roll contacting roller mounted on the first end and pivotally mounted at the second end thereof to the stationary mounting means. A follower spring means biases the follower arm toward the roll such that the roll contacting roller contacts the periphery of the supply roll. A cam means is secured to the follower arm and engages the lever arm member, whereby the translational position of the lever arm member is controlled by the position of the supply roll follower means. The lever arm member includes a cam following roller for following the cam means.

The stationary mounting means may comprise a mounting plate and the slidable pivot means may comprise a pivot roller attached to an end of the lever arm member and translatable along a slot defined by the mounting plate.

The lever arm member may further include a lever arm spring applying a spring force thereto which urges the cam following roller into contact with the cam means. The lever arm member defines an elongated slot and the spring linkage means including a roller engaged by the slot. The actuator arm may also include a roller engaged by the slot in the lever arm member.

The reel actuating device may further comprise a stop pin attached to the stationary mounting means for limiting movement of the actuator arm toward the web. Additionally, the actuating device includes a follower retraction arm operatively connected to the supply roll follower means for retracting the supply roll follower means from the supply roll.

Accordingly, it is an object of the present invention to provide a reel actuating device for applying an unreeling force to a web of material adjacent a supply roll of the web, which force is dependent in magnitude upon the radius of the supply roll; to provide such a device including a supply reel actuator contacting the web and spring biased into an initial position defining a relatively long web supply path, such that movement of the web by means of the web drive means initially causes the actuator to move such that the supply path is shortened while the supply roll remains stationary and, thereafter, the spring force returns the actuator to its initial position, causing the actuator to apply the web unreeling force to the web and thereby rotate the supply reel and unreel the web therefrom; to provide such a device in which an actuator arm is pivoted by a spring means which applies a variable spring force to the arm and in which the arm carries a web contacting roller; and to provide such a device in which the supply roll follower means includes a follower arm having a roll contacting roller mounted at a first end, with the follower arm being pivotally mounted at its second end, and in which a spring biases the follower arm toward the supply roll such that the roll contacting roller contacts the periphery of the supply roll.

Other objects and advantages of the invention will be apparent from the following description, the accompanying drawings and the appended claims.

DETAILED DESCRIPTION OF THE PREFERRED EMBODIMENT

Figure 1:
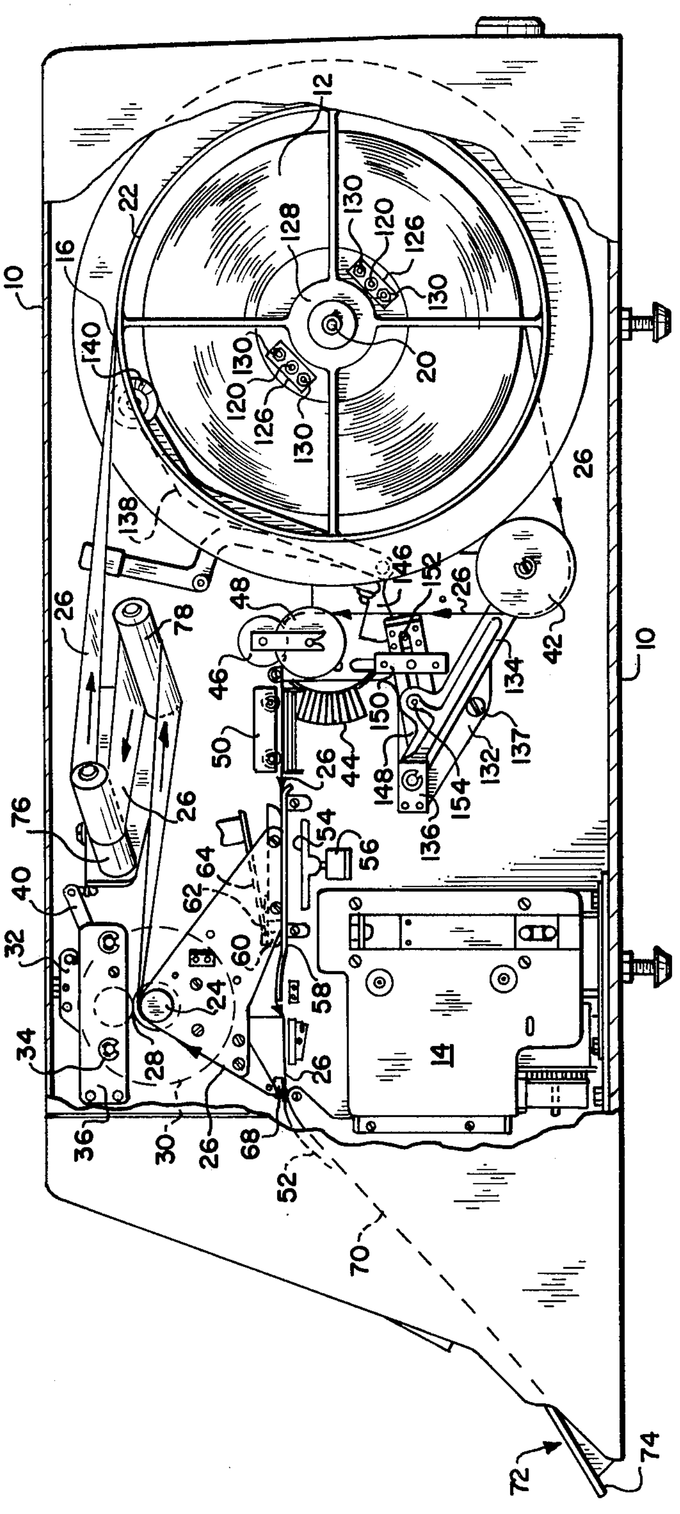
FIG. 1 is a side elevational view of a printer system incorporating the reel actuating device of the present invention with portions of the printer cabinet broken away to reveal internal structure.
Figure 2:
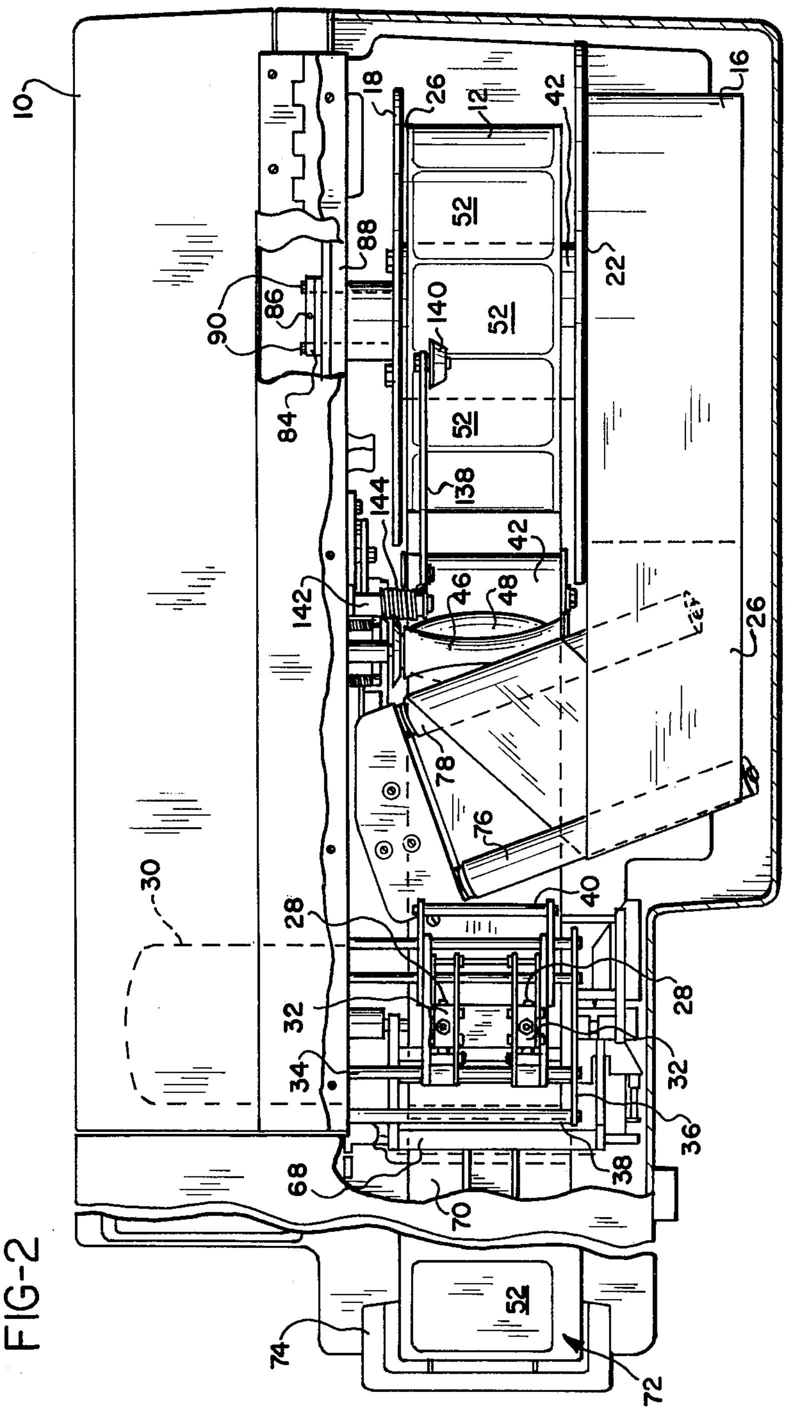
FIG. 2 is an elevational plan view of the printer system of FIG. 1, with portions of the printer cabinet broken away to reveal internal structure.

FIGS. 1 and 2 illustrate a printer system incorporating the present invention. The printer system, enclosed within printer cabinet 10, includes an arrangement for transporting a web of label-bearing material through a web supply path from a supply roll 12, past a printer 14, to a take up roll 16. Printer 14 may be any of a number of known printers, such as disclosed in U.S. Pat. No. 3,973,488, issued Aug. 10, 1976, to Mielke. A supply reel 18, on which the web is wound onto supporting supply roll 12, is rotatably mounted on a stationary reel support means, including shaft 20. A take up reel 22 is rotatably mounted on the shaft 20 and supports the take up roll 16.

A web drive means, including a drive roller 24 contacting a first side of web 26, pinch rollers 28 contacting a second side of the web 26 and pressing the web against the drive roller 24, and a motor means including stepper motor 30 which rotates the drive roller 24, is provided for unreeling material from the supply roll 12. The pinch rollers 28 are mounted on a frame 32 which is pivotable about shaft 34 supported by support brackets 36 and 38. Handle 40 is provided to pivot the frame 32 out of its operating position to facilitate threading the web 26 through the supply path when a new supply roll 12 is loaded onto supply reel 18.

A clutch means 41 is interposed between the supply reel 18 and the take up reel 22 for rotating the take up reel 22 and the take up roll 16 mounted thereon as the web of material is unreeled from the supply roll 12. As explained more fully below, substantially the same length of the web 26 is wound onto the take up roll 16 as is unreeled from the supply roll 12.

The web 26 is withdrawn from the supply reel 18 and initially passes around a roller 42 which forms a part of a supply reel actuator. The roller 42 is movable generally vertically between a first position, shown in FIG. 1, and a second position somewhat above that illustrated in FIG. 1, in which the length of the web supply path is effectively shortened. An actuator spring means, including spring 44 applies a spring biasing force which urges the supply reel actuator toward its first position.

Web 26 passes generally upward from roller 42 to a curl elimination means, including rollers 46 and 48, which eliminates the curl which may be taken on by the web of material 26 during the time in which it is coiled in the supply roll 12. Rollers 46 and 48 are generally concave and convex respectively, such that they bend the web 26 into an arc extending widthwise across the web. Thereafter, the web 26 passes through a label sensor 50 of conventional design.

As seen in FIG. 2, the printer system is advantageously used for printing on labels 52 which are mounted on a web of release material. Each of the labels 52 has a coating of pressure sensitive adhesive on its back surface which adheres to the web 26. The web 26 has a relatively smooth surface which permits the labels to be removed readily from the web after printing on the labels is completed. In order for each of the labels to be printed with the desired print information properly aligned thereon, the label sensor 50 detects the position of successive labels on the web 26 by a conventional photo-optical technique and provides this information to the printer control circuitry for controlling operation of motor 30. The web 26 extends past a printer plate 54 which may be utilized to print nonvariable information successively on each label. The plate 54 may be formed of an ink impregnated rubber and is actuated upward into contact with each label 52 by means of solenoid actuator 56. It will be appreciated that the labels 52 on the web 26 face generally downward as they pass through this portion of the supply path.

The web 26 thereafter passes between a plate 58 and a spring mounted skid bar 60 which act as a web tensioning means, contacting the web 26 between the supply reel 22 and the printer 14, and holding the web in tension. As may be seen in FIG. 1, the skid 60, mounted on spring arm 62, has a lever arm 64 attached thereto for pivoting the skid bar 60 upward to facilitate threading the web 26 between the bar 60 and the plate 58.

The web 26 thereafter passes above the printer 14, which in FIG. 1 is shown in a nonoperational lowered position for the purposes of clarity. During printing, printer 14 is raised on a sliding printer support mechanism (not shown) such that it is directly below the web 26 for printing on successively presented labels 52.

The web 26 then passes around a knife edge means including bar 68, which contacts the side of the web 26 opposite that on which the labels are mounted and defines a sharp bend in the web supply path. As the release material 26 passes around the sharp edge of the bar 68, the labels are released from the web, as shown in FIG. 1. The labels so released thereafter slide down a chute 70 which guides the labels to an application station 72. The labels 52 are caught at the application station 72 by means of a pivotable label catching bar 74 which holds each label caught with its adhesive coating facing generally upward. A package to which the label is to be applied may be pressed against the label at the application station 72, with the bar 74 pivoting downward to permit application of the label 52 to the package.

The web 26 moves upward past the web drive means and is returned to the take up reel 22. As seen in FIG. 2, the supply reel 18 and the take up reel 22 are both mounted on the stationary reel support shaft 20 and rotate about the same rotational axis. As a consequence, it is necessary to divert the web 26 in a direction generally parallel to the rotational axis of the supply reel 18 and the take up reel 22 in order that the web 26 may be wound onto the take up reel 22. To provide such a shift in the web path, a pair of web diverting rollers 76 and 78 are mounted for rotation about parallel axes, which axes are nonparallel with respect to the axis of rotation of the supply reel 18 and the take up reel 22. As can be seen most clearly in FIG. 2, the web 26 passes upwardly around roller 78 and extends back toward the roller 76. The web 26 then passes again upwardly around roller 76 in proper alignment with the take up roll 16.

Reels 18 and 22 are both free to rotate upon shaft 20. Reel 18 is caused to rotate clockwise, as seen in FIG. 1, as the web 26 is unreeled therefrom by the web drive means including rollers 24 and 28 and motor 30. As the reel 18 is rotated, the clutch means 41, which provides frictional engagement between the reel 18 and the take up reel 22, applies a torque to reel 22 which causes the take up reel to rotate in a clockwise direction such that a length of web material 26, corresponding to that which is unwound from reel 18, is wound onto the take up reel 22. The take up reel 22 has a radius which is greater than that of the supply roll 12. As a result, the angular rotation required by the take up reel 22 to wind a given length of material thereonto is less than the angular rotation of the supply reel as a corresponding given length of material is unreeled. Furthermore, as the radius of the supply roll decreases as the given length of web is unreeled, the angular rotation required by the supply reel increases while the angular rotation required by the take up reel decreases. Consequently, the relative rotational motion between the supply and take up reels increases as the supply roll radius decreases. The clutch means 41 provides a slip clutch mechanism by which relative rotation between the supply reel 18 and the take up reel 22 may be permitted. It will be appreciated that by virtue of this web drive arrangement, only a single drive mechanism engaging the tape is utilized, and rotation of both the supply reel and the take up reel results solely from movement of the web 26 through the web supply path of the printer system. Furthermore, the driving of the take up reel by the supply reel through the slip clutch also inherently provides a self-braking action on the supply reel.

Figure 3:
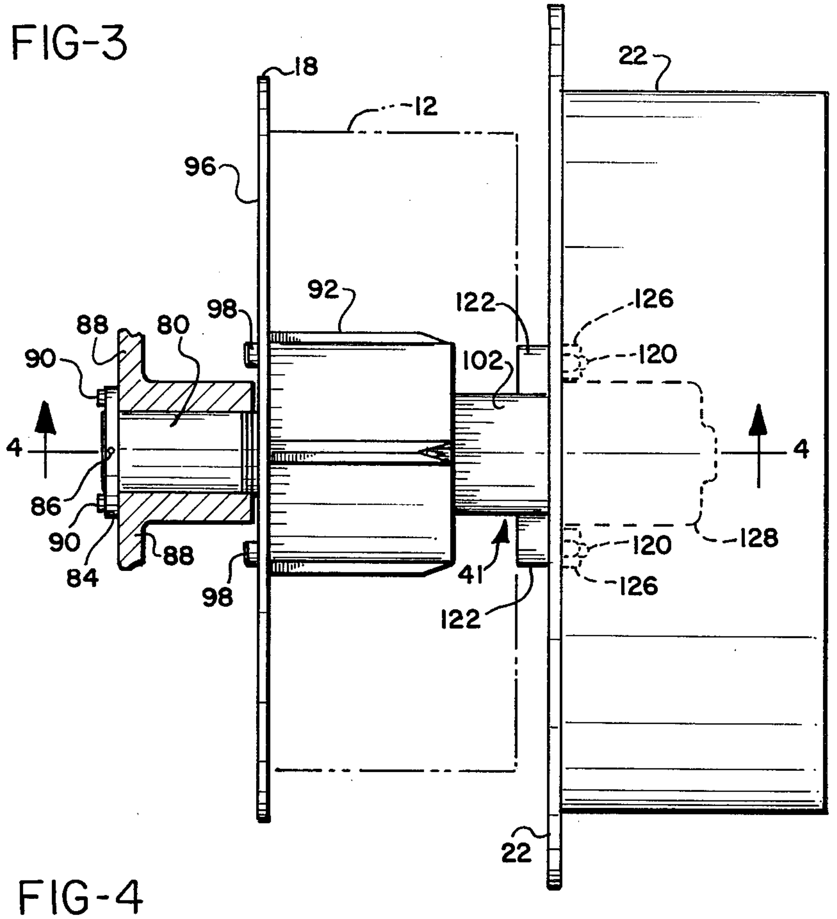
FIG. 3 is a front view illustrating the supply reel and take up reel of the printer.
Figure 4:
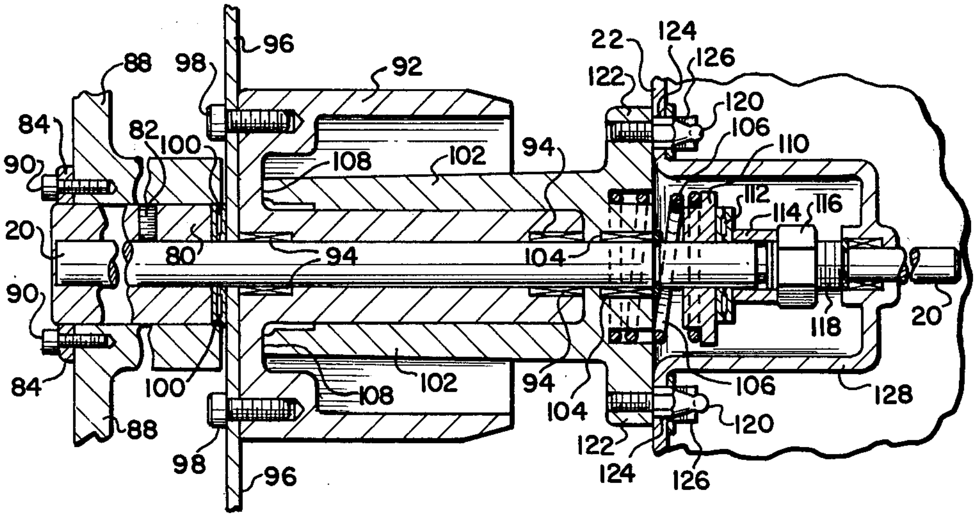
FIG. 4 is an enlarged sectional view taken along line 4—4 in FIG. 3.

FIGS. 3 and 4 illustrate the clutch means in greater detail. Stationary support shaft 20 is journalled within bushing 80 and secured thereto by means of set screw 82. Bushing 80 is in turn held within mounting ring 84 by set screws 86 and is secured to vertical support plate 88 by bolts 90. Supply reel 18 includes a central hub 92 having hub bearing means, such as roller bearings 94 for providing free rotation of the supply reel about the stationary support shaft 20. Hub 92 is secured to the disc-shaped flange portion 96 of the reel 18 by means of threaded bolts 98. A thrust bearing 100 is interposed between the bushing 80 and the disc-shaped flange portion 96 of the reel 18 so as to prevent rubbing therebetween which would otherwise inhibit free rotation of the reel.

Clutch means 41 includes a clutch hub 102 which is mounted for free rotation on the stationary support shaft 20 by roller bearing 104. The clutch means further includes clutch spring means, including spring 106, for urging the clutch hub 102 into contact with the central hub 92 of the supply reel 18 such that the clutch hub 102 frictionally engages the central hub 92. Substantially all of the frictional engagement between the hub 102 and the hub 92 occurs at the leftmost end of the hub 102, along the contacting surfaces indicated at 108.

A means for adjusting the force with which the clutch hub 102 is urged into contact with the central hub 92 of the supply reel 18 includes spring contacting bushing 110, thrust bearing 112, cylindrical spacer 114, and nut 116. Nut 116 engages threaded portion 118 of shaft 20 and by appropriate rotation may be moved to the right or to the left as seen in FIG. 4. Nut 116 and cylindrical spacer 114 remain stationary on stationary shaft 20, while the thrust bearing 112 permits the spring 106 and the spring engaging bushing 110 to rotate with the clutch hub 102. Nut 116 permits an adjustment to be made in the compression spring force applied to the hub 102 and, as a consequence, the frictional engagement between the hub 102 and the hub 92 may be adjusted. The clutch hub 102 has a pair of connector studs 120 threaded into radially extending ears 122. Studs 120 extend through openings 124 in reel 22 and are engaged by clips 126 attached to the hub 128 of reel 22 by means of screws 130 (FIG. 1). Studs 120 and cooperating clips 126 permit the take up reel 22 to be removed readily when a new supply roll 12 is to be loaded onto supply reel 18.

FIGS. 5–8 illustrate in greater detail the reel actuating device of the present invention which applies a spring force to web 26 and in the preferred embodiment is a variable force inertial arm system. The supply reel 18 and the take up reel 22 are shown in dashed lines and the web 26 has been removed for purposes of clarity. The movement of the web 26 through the supply path to the printer is accomplished in an incremental manner. That is, after a label is printed by printer 14, the web is advanced at a relatively rapid rate such that the next successive label is brought into registration with the printer. The web is then held stationary at the printer during the printing operation. It will be appreciated that if the take up and supply reels were to be rotated in such an incremental fashion along with the incremental movement of the web past the printer, the inertia of the supply and take up rolls would be difficult to overcome. Additionally, since the drive for both the supply reel and the take up reel is accomplished solely by the web drive, rapid incremental rotation of the supply reel and the take up reel would place a significant strain on the web 26 which could result in damaging or tearing the web.

In order to overcome this difficulty, the reel actuating device initially defines a relatively long web supply path from the supply roll 12 to the rollers 46 and 48, as illustrated in FIG. 1. Spring 44 through a linkage arrangement described below provides a downward spring force urging the roller 42 against the web 26. When the web drive arrangement moves the web 26 an incremental distance past the printer 14, the web 26 draws the roller 42 upward against the spring force provided by spring 44 such that the length of the supply path from the supply roll 12 to the rollers 46 and 48 is reduced by a distance equal to the incremental movement of the web 26. At this point the web 26 has been advanced by a distance equal to the spacing between successive labels 52, the roller 42 has been drawn upward, but the supply reel and the take up reel have remained stationary. Thereafter, the spring force provided by spring 44 moves the roller 42 downward into the position shown in FIG. 1, causing the roller 42 to apply an unreeling force to the web. At the same time, the unreeling force applied to the web of the supply roll by the downward movement of the roller 42 produces a torque, dependent upon the radial moment arm at the supply roll. The torque causes rotation of the supply reel 18 such that the required length of web 26 is unreeled. Further, the torque is transmitted through the clutch 42 to the take up reel 22, causing the take up reel 22 to rotate an amount sufficient to wind the incremental length of web 26 thereon.

It will be appreciated that as the supply roll 12 is unreeled during the course of operation of the printer system, the radius of the supply roll is gradually reduced. If a constant downward spring force were to be applied to roller 42 as the web of material is unreeled from the supply roll, a point would be reached at which the torque produced at the supply roll by the unreeling of the roller 42 pulling against web 26 and acting on the radial moment arm at the supply roll, would decrease and become insufficient to overcome the characteristic torque provided between the supply reel 18 and the take up reel 22 by the clutch 42. This would occur since the length of the moment arm defined by the radius of the supply roll shortens as the supply roll radius decreases. As a consequence, the present invention includes a reel actuating device in which the downward force applied to roller 42 varies in dependence upon the radius of the supply roll 12. Specifically, the spring force, and thereby the unreeling force, increase as the radius of, and thus the radial moment arm at, the supply roll decrease so that a constant torque is applied to the supply roll sufficient to provide uniform unreeling of the web from the supply reel and reeling of the web back on the take up reel.

Figure 5:
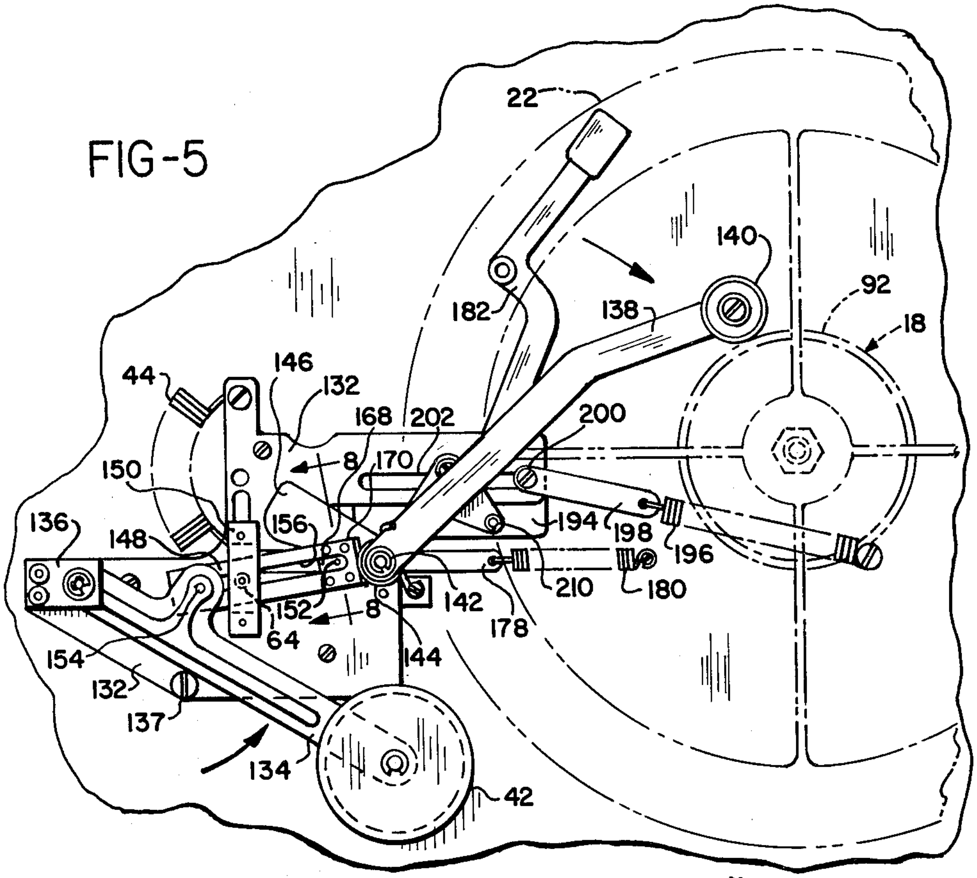
FIG. 5 is an enlarged side elevational view, similar to FIG. 1, of the reel actuating device of the present invention with the follower arm in its operating position.

A stationary mounting means, including mounting plate 132, is provided with an actuator arm 134 pivotally mounted at a first end thereof to bracket 136 which is secured to plate 132. Web contacting roller 42 is mounted on the second end of the actuator arm 134 for applying a force to the web 26. Downward movement of actuator arm 134 is limited by stop 137. To monitor the radius of the supply roll 12, a supply roll follower means is provided including follower arm 138 having a roll contacting roller 140 mounted on a first end thereof. Follower arm 138 is pivotally mounted on shaft 142 attached to plate 132 and, when in its operating position as shown in FIG. 5, contacts the periphery of the supply roll 12. The supply roll follower means further includes a follower spring means, including spring 144, which biases the follower arm 138 toward the supply roll such that the roller 140 contacts the periphery of the supply roll. A cam means, including cam plate 146 is secured to the follower arm 138 and pivots therewith.

A spring means, including lever arm member 149, spring linkage means 150, actuation spring 44, and slidable pivot means 152, is mounted on the stationary mounting means and cooperates with the supply roll follower means for applying a variable spring force to a roller 154 on the actuator arm 134 at a point intermediate the first and second ends of the actuator arm 134. The spring force urges the web contacting roller 42 toward the web 26 and varies in magnitude in dependence upon the position of the roller 140 which monitors the radius of the supply roll 12. Consequently, as the supply roll is gradually reduced in radius as the roll is unreeled, the downward force applied to the web by the roller 42 is increased in order to apply a substantially uniform torque to the supply reel 18. The lever arm member 148 defines a slot 156 therein which receives the roller 154 secured to the actuator arm 134.

Figure 6:
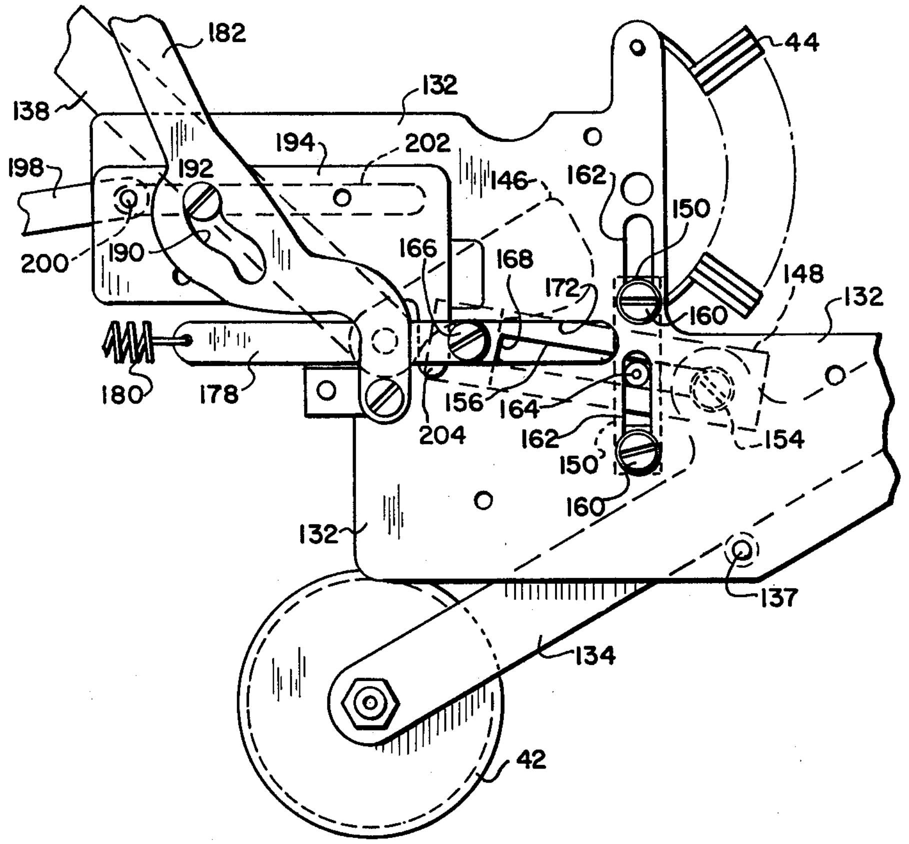
FIG. 6 is an enlarged view of the reel actuating device of the present invention as seen from the side opposite that shown in FIG. 5.
Figure 7:
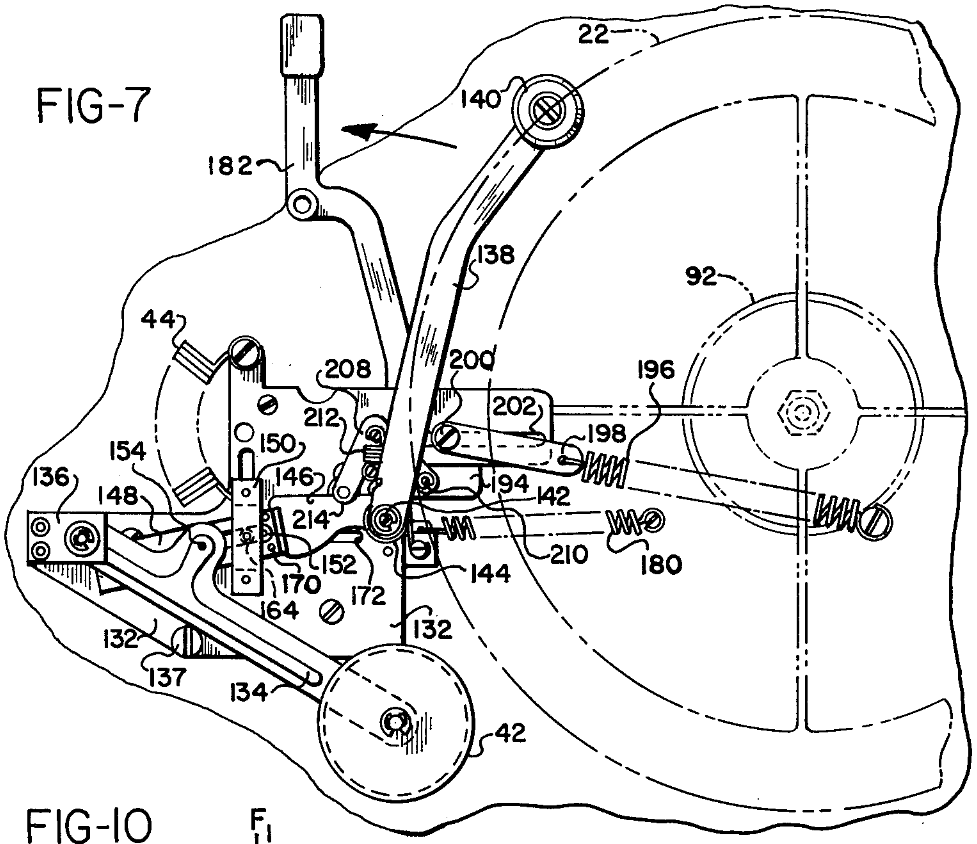
FIG. 7 is a view similar to FIG. 5, with the follower arm retracted from its operating position.

Spring linkage means 150 includes a pair of bolts 160 which extend rearwardly (as seen in FIGS. 5 and 7) into slots 162 (FIG. 6) in plate 132. The spring linkage means 150 is free to move vertically with bolts 160 sliding in slots 162. Spring 44 is connected at one end to plate 132 and at the other end to spring linkage 150 and provides a substantially uniform downward spring force, generally independent of the vertical position of the linkage 150. The spring linkage 150 also includes a roller 164 extending rearwardly therefrom into slot 156 of lever arm member 148. The spring linkage means 150 thus engages the lever arm member 148 at a predetermined distance from the point 154 intermediate the first and second ends of the actuator arm 134.

Figure 8:
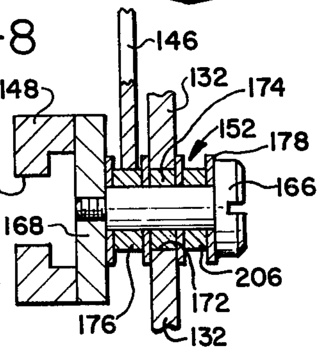
FIG. 8 is a sectional view taken generally along line 8—8 in FIG. 5.

Slidable pivot means 152 engages the end of lever arm member 148 and permits the lever arm member to pivot and, further, permits translational movement of the lever arm member. As illustrated in FIG. 8, the slidable pivot means 152 includes a bolt 166 threaded into block 168 which is secured to lever arm member 148 by rivets 170. Bolt 166 extends through slot 172 (FIG. 6) in plate 132 and has mounted thereon a roller 174 which facilitates movement of the arm member 148 along the slot 172. A second roller 176 is mounted on bolt 166. Roller 176 contacts cam 146 and thus moves lever arm member 148 in response to pivoting of arm 138 and cam 146.

Also attached to bolt 166 is link 178 which is attached to spring 180. Spring 180 applies a force to the lever arm member 148 which tends to move it along the slot 172 until the roller 176 contacts cam 146. Since cam 146 is attached to arm 138, the position of the cam and, therefore, the position of lever arm member 148 is dependent upon the radius of the supply roll 12 on the reel 18.

As the supply roll is unwound and gradually reduces in radius, the lever arm member 148 is gradually moved to the right. Specifically, FIGS. 9 and 10 indicate the limits of translational movement of the lever arm member 148. The position illustrated in FIG. 9 corresponds to that obtained when a new supply roll is loaded onto the supply reel and the position shown in FIG. 10 corresponding to that obtained when the supply reel has been almost completely unwound.

Figure 9:
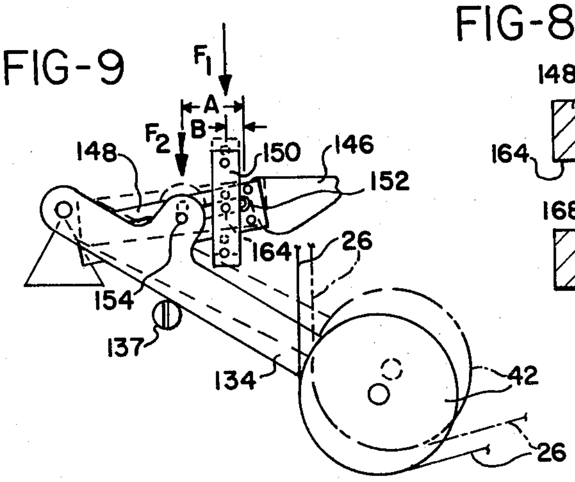
FIG. 9 is a diagrammatic view, similar to FIG. 5 illustrating operation of the reel actuating device of the present invention with a supply roll of relatively large radius.
Figure 10:
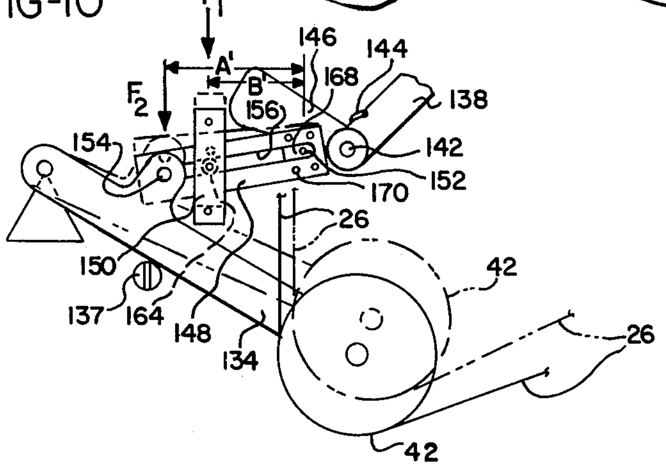
FIG. 10 is a diagrammatic view, similar to FIG. 5, illustrating operation of the reel actuating device of the present invention with a supply roll of relatively small radius.

The manner in which the reel actuating device provides a web unreeling force on the web 26 which varies in dependence upon the radius of the supply reel 12 is illustrated in FIGS. 9 and 10. Initially, the lever arm member 148 is held in the position illustrated in FIG. 9 such that the arm member 148 pivots about a pivot point 152 which is relatively close to rollers 154 and 164. It can be seen, therefore, that the force applied to arm 134 at point 154 will be $F_2 = B/A \times F_1$, where $F_1$ equals the downward spring force provided by spring 44.

When, however, most of the web of material on the supply roll 12 has been unreeled and the radius of the roll has been reduced substantially, the cam 146 will have been pivoted into the position shown in FIG. 10, thus permitting the lever arm member 148 to move a substantial distance to the right. The downward force applied to point 154 of arm 134 is now $F_2 = B'/A' \times F_1$. Since $B'/A'$ is substantially greater than $B/A$, the downward force applied to point 154 and, therefore, the downward force applied to the web 26 by the roller 42 will be substantially greater for the condition illustrated in FIG. 10 as compared to that illustrated in FIG. 9.

When the supply roll 12 has been completely used and a new supply roll is to be loaded onto supply reel 18, a retraction arm 182 is raised, as shown in FIG. 7. Arm 182 defines a contoured slot 190 (FIG. 6) which engages screw 192 extending therethrough into plate 194. Plate 194 is normally held in the position shown in FIG. 6 by means of spring 196 (FIG. 7) which applies a spring force to link 198. Plate 194 is held in position on plate 132 by means of bolt 200 which engages link 198 and extends through slot 202 in plate 132. When arm 182 is raised, plate 194 is therefore moved to the right, as seen in FIG. 6, against the opposing spring force provided by spring 196, such that downward extending finger 204 of plate 194 presses against spacer 206 (FIG. 8) on bolt 166. This, in turn, slides the arm member 148 to the right, as seen in FIG. 6. Thereafter, V-shaped link 208, pivotally mounted by bolt 210 on plate 194, is urged downward by spring 212 extending between link 208 and plate 194 such that roller 214 on the end of the V-shaped link 208 presses down against the top edge of cam 146, pushing cam 146 downward into position shown in FIG. 7. Since cam 146 is attached to arm 138, arm 138 is thereby raised into the position shown in FIG. 7 to permit insertion of a new supply roll 12. Retraction arm 182 is then moved to the right, as seen in FIG. 7, the slide plate 194 into the position illustrated in FIG. 6, thus permitting arm 138 to be pivoted by spring 144 such that roller 140 contacts the newly loaded supply roll 12.

While the form of apparatus herein described constitutes a preferred embodiment of the invention, it is to be understood that the invention is not limited to this precise form of apparatus, and that changes may be made therein without departing from the scope of the invention.

What is claimed is:

1. In a system having a rotatably mounted supply reel, a supply roll of a web of material wound on said supply reel, and web drive means for transporting said web of material, a reel actuating device for causing unreeling of said web of material from said supply reel, which decreases the radius of said supply roll, comprising:

a stationary mounting means, an actuator arm pivotally mounted at a first end thereof to said stationary mounting means, a web contacting roller mounted on a second end of said actuator arm and engaged with said web at a location between said web drive means and said supply reel for applying a web unreeling force to said web, supply roll follwer means, pivotally mounted on said stationary mounting means and extending to a position in contact with the periphery of said supply roll, said position of said roll follower means changing in response to decrease in the radius of said supply roll as said web of material is unreeled from said supply reel, and spring means, mounted on said stationary mounting means and cooperating with said supply roll follower means, for applying a spring force to said actuator arm at a point intermediate said first and second ends thereof which, in turn, causes said applying of said web unreeling force by said web contacting roller to said web, said spring and web unreeling forces varying in magnitude in dependence upon the position of said supply roll follower means.

2. The reel actuating device of claim 1 in which said spring means comprises a lever arm member engaging said actuator arm at said point intermediate said first and second ends thereof, spring linkage means engaging said lever arm member a predetermined distance from said point intermediate said first and second ends of said actuator arm, an actuation spring connected to said spring linkage means for applying a substantially constant spring force thereto, and slidable pivot means engaging an end of said lever arm member, permitting said lever arm member to pivot about a pivot point and further permitting translational movement of said lever arm member, whereby the spacing between said pivot point and the points at which said lever arm member engages said actuator arm and said spring linkage means may be varied such that the position of said lever arm member is controlled by the position of said supply roll follower means to determine the force applied to said web by said web contacting roller in dependence upon the radius of said supply roll.

3. The reel actuating device of claim 2 in which said supply roll follower means comprises a follower arm having a roll contacting roller mounted on a first end and pivotally mounted at the second end thereof to said stationary mounting means, follower spring means biasing said follower arm toward said roll such that said roll contacting roller contacts the periphery of said supply roll, and cam means secured to said follower arm and engaging said lever arm member, whereby the translational position of said lever arm member is controlled by the position of said supply roll follower means.

4. The reel actuating device of claim 3 in which said lever arm member includes a cam following roller for following said cam means.

5. The reel actuating device of claim 2 in which said stationary mounting means comprises a mounting plate and in which said slidable pivot means comprises a pivot roller attached to an end of said lever arm member and translatable along a slot defined by said mounting plate.

6. The reel actuating device of claim 4 in which said lever arm member further includes a lever arm spring applying a spring force thereto which urges said cam following roller into contact with said cam means.

7. The reel actuating device of claim 2 in which said lever arm member defines an elongated slot and in which said spring linkage means includes a roller engaged by said slot.

8. The reel actuating device of claim 7 in which said actuator arm includes a roller engaged by said slot in said lever arm member.

9. The reel actuating device of claim 1 further comprising a stop pin attached to said stationary mounting means for limiting movement of said actuator arm toward said web.

10. The reel actuating device of claim 1 further comprising a follower retraction arm operatively connected to said supply roll follower means for retracting said supply roll follower means from said supply roll.

11. In a system having a rotatably mounted supply reel, a supply roll of a web of material wound on said reel, and a web drive means for transporting said web of material through a web supply path from said supply roll, a reel actuating device for unreeling said web of material from said supply reel, comprising:

a supply reel actuator, engaging said web at a location between said web drive mean and said supply reel, for applying a web unreeling force to said web, said supply reel actuator being movable between a first position, in which the web supply path length between said supply roll and said web drive means is relatively long, and a second position, in which the web supply path length between said supply roll and said web drive means is shortened, movably mounted supply roll follower means, positioned in contact with the periphery of said supply roll, said position of said roll follower means changing in response to decrease in the radius of said supply roll as said web of material is unreeled from said supply reel, and actuator spring means, cooperating with said supply roll follower means, for applying a spring biasing force of varying magnitude to said supply reel actuator in dependence upon the position of said supply roll follower means, said spring biasing force urging said supply reel actuator toward said first position, whereby movement of said web through said supply path by said web drive means initially causes said actuator to move toward said second position while said supply reel remains stationary and, thereafter, said actuator spring means moves said actuator back toward said first position, causing said actuator to apply said web unreeling force to said web, thereby rotating said supply reel and unreeling said web therefrom.

* * * * *

UNITED STATES PATENT AND TRADEMARK OFFICE
CERTIFICATE OF CORRECTION

PATENT NO. : 4,330,097

DATED : May 18, 1982

INVENTOR(S) : Mark S. George; Arthur W. Stucke

It is certified that error appears in the above—identified patent and that said Letters Patent is hereby corrected as shown below:

In the Title

"WINDING CONTROL" should be -- WINDER CONTROL --

Column 8, line 59, the word "force" has been omitted after the word "unreeling".

Column 9, line 29, "149" should be --148--.

Column 10, line 68, "the slide plate" should read --to slide plate--.

Column 11, line 26, "follwer" should be -- follower--.

Column 12, line 48, "drive mean" should be --drive means--.

Signed and Sealed this

*Twenty-first* Day of *September 1982*

[SEAL]

*Attest:*

GERALD J. MOSSINGHOFF

*Attesting Officer* *Commissioner of Patents and Trademarks*